(12) United States Patent
Elsherif et al.

(10) Patent No.: US 8,675,137 B2
(45) Date of Patent: Mar. 18, 2014

(54) APPARATUS AND METHOD FOR ADAPTIVE FILTERING

(75) Inventors: Ahmed Ragab Elsherif, Giza (EG);
Mohamed Abd El-Salam Ali, Ramadan (EG); Nabil Yousef Wasily, Foothill Ranch, CA (US)

(73) Assignee: Newport Media, Inc., Lake Forest, CA (US)

(*) Notice: Subject to any disclaimer, the term of this patent is extended or adjusted under 35 U.S.C. 154(b) by 615 days.

(21) Appl. No.: 12/759,656

(22) Filed: Apr. 13, 2010

(65) Prior Publication Data
US 2011/0249184 A1    Oct. 13, 2011

(51) Int. Cl.
*H04N 5/14* (2006.01)
*H04N 9/64* (2006.01)
*H04N 5/00* (2011.01)

(52) U.S. Cl.
USPC .......... 348/620; 348/571; 348/607; 348/618; 348/619

(58) Field of Classification Search
USPC ........................................ 348/620
See application file for complete search history.

(56) References Cited

U.S. PATENT DOCUMENTS

| | | | | |
|---|---|---|---|---|
| 4,242,704 A * | 12/1980 | Ito et al. | | 348/620 |
| 4,646,138 A * | 2/1987 | Willis | | 348/621 |
| 5,418,570 A * | 5/1995 | Ueno et al. | | 375/240.14 |
| 5,719,793 A * | 2/1998 | Nitta et al. | | 382/275 |
| 5,832,143 A * | 11/1998 | Suga et al. | | 382/300 |
| 2001/0033341 A1 * | 10/2001 | Limberg | | 348/614 |
| 2007/0230640 A1 * | 10/2007 | Bryan et al. | | 375/349 |
| 2009/0109238 A1 * | 4/2009 | Yin et al. | | 345/600 |

* cited by examiner

*Primary Examiner* — Jefferey Harold
*Assistant Examiner* — Michael Teitelbaum
(74) *Attorney, Agent, or Firm* — Rahman LLC (57) ABSTRACT

An apparatus and a method for adaptive filtering includes an antenna that receives analog video broadcast signal data; an analog-to-digital converter coupled to the antenna and converting the received analog video broadcast signal data to digital video signal data; a frame buffer memory storing the digital video signal data; an instruction memory storing adaptive filtering instructions; and an adaptive filter coupled to the memory and the analog-to-digital converter, wherein the adaptive filter: reads the adaptive filter instructions from the memory; executes the adaptive filter instructions; averages an input pixel with a corresponding pixel stored in the frame buffer memory; calculates a forgetting factor for each pixel in the plurality of pixel values stored in the frame buffer memory; and filters noise from each pixel of the plurality of pixel values stored in the frame buffer memory based on the forgetting factor.

20 Claims, 6 Drawing Sheets

APPARATUS AND METHOD FOR ADAPTIVE FILTERING

BACKGROUND

1. Technical Field

The embodiments herein generally relate to adaptive filtering, and, more particularly, to adaptive filtering of video signal data.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In conventional video broadcast systems, a stationary receiver (e.g., a television receiver) includes a tuning device that receives a video signal (e.g., television signal) transmitted from a broadcasting station selected from among a plurality of broadcasting stations (channels). With conventional video broadcast systems, however, true mobility (e.g., mobile reception of a video signal) introduces complications not envisioned or addressed within the design framework (or relevant broadcast standards) of conventional video broadcast systems because such systems where designed for a traditionally fixed reception device (e.g., a stationary television set).

Examples of conventional video broadcast systems include the National Television Systems Committee (NTSC) standard, the Phase Alternate Line (PAL), and the Sequential Color with Memory (SECAM) standard. The NTSC/PAL/SECAM systems are currently widely-spread for analog television signal broadcasting all over the world. Although this analog television signal was originally intended for stationary reception, new mobile device are becoming available that include tuning devices, which allow reception of these analog television signals.

Mobile reception of an analog television signal, however, is significantly more complicated than traditional reception of an analog television signal. For example, with a traditional fixed television set, a user can change the direction of the receiving antenna until a satisfactory signal quality is received. Mobile reception does not offer this degree of flexibility. With mobile reception, an analog television signal experiences time-varying channel quality (e.g., movement of the mobile receiver) that results in fading and receiving signals at different levels including severely attenuated time regions (e.g., deep fades or dead regions). Additionally, poor video reception quality may be encountered due to shadowing, and large distances from the conventional video broadcast system transmitter. Consequently, with mobile reception, the received video signal does not simply experience a static signal-to-noise ratio (as found in conventional video broadcast systems), but rather undergoes a variable signal-to-noise ratio that effects video quality.

SUMMARY

In view of the foregoing, an embodiment herein provides a system for adaptively filtering noise from an analog video broadcast signal, the system comprising an antenna that receives analog video broadcast signal data; an analog-to-digital converter coupled to the antenna and converting the received analog video broadcast signal data to digital video signal data; a frame buffer memory storing the digital video signal data as a plurality of horizontal lines, wherein the plurality of horizontal lines comprise a plurality of pixel values; an instruction memory storing adaptive filtering instructions; and an adaptive filter coupled to the memory and the analog-to-digital converter, wherein the adaptive filter reads the adaptive filter instructions from the memory; executes the adaptive filter instructions; averages an input pixel with a corresponding pixel stored in the frame buffer memory; calculates a forgetting factor for each pixel in the plurality of pixel values stored in the frame buffer memory; and filters noise from each pixel of the plurality of pixel values stored in the frame buffer memory based on the forgetting factor.

Such a system may further comprise an analog signal equalizing system coupled to the analog-to-digital converter, wherein the analog signal equalizing system equalizes the received analog video broadcast signal data. In addition, the analog equalizing system may comprise at least one of an automatic gain controller and an equalizer. Moreover, the analog equalizing system comprises an automatic gain controller and the adaptive filter compensates the forgetting factor for a noise measured by the equalizer. Furthermore, the analog equalizing system may comprise an equalizer and the adaptive filter compensates the forgetting factor for a channel power measured by the equalizer.

In addition, in such a system, the analog video broadcast signal data may comprise at least one of an odd analog video signal data and an even analog video signal data. Moreover, the analog-to-digital converter may convert the odd analog video signal to odd digital video signal data and the analog-to-digital converter may convert the even analog video signal data to digital video signal data. Furthermore, the frame buffer memory may comprise a display frame.

Additionally, such a system may further comprise a display device, wherein the adaptive filter averages the input pixel to a corresponding pixel in the frame buffer and send the average to the display device and to the corresponding pixel location in the frame buffer memory. In addition, a horizontal input line may be repositioned when the horizontal input line corresponds to an odd frame, wherein the repositioning averages an upper and a lower input line using a corresponding horizontal line stored in the frame buffer memory. Furthermore, the adaptive filter may adjust the forgetting factor using an estimation of channel power and an estimation of noise power.

Another embodiment herein provides a method of adaptively filtering noise in analog video broadcast signal data, the method comprising receiving the analog signal data; converting the analog video broadcast signal data to first digital signal data comprising a plurality of first pixel values; providing second digital signal data stored in a frame buffer memory, wherein the second digital signal data comprises a plurality of second pixel values; calculating a forgetting factor for every pixel in the first digital signal data; and averaging the first digital signal data and the second digital signal data using the forgetting factor to determine a first weight to adjust the first digital signal data and a second weight to adjust the second digital signal data.

In such a method, the first weight may be calculated as $\alpha$ and the second weight may be calculated as $1-\alpha$, where $\alpha$ comprises the forgetting factor. In addition, the analog video broadcast signal data may comprise at least one of an odd analog video signal data and an even analog video signal data.

Such a method may further comprise converting the odd analog video signal to the first digital signal data, wherein the second digital signal data comprises a digitized copy of the even analog video signal data. In addition, the first digital signal data may comprise a plurality of horizontal lines; and each of the plurality of horizontal lines may comprise a plurality of pixel values, and the method may further comprise averaging a first horizontal line of the plurality of horizontal lines and a second horizontal line of the horizontal lines to obtain an intermediate line.

In addition, such a method may further comprise detecting motion between the first digital signal data and the second digital signal data and automatically adjusting the forgetting factor when motion is detected. Such a method may also further comprise detecting a scene change between the first digital signal data and the second digital signal data and automatically setting the forgetting factor to one when the scene change is detected. Furthermore, such a method may further comprise adjusting the forgetting factor using a estimation of channel power and an estimation of noise power. Moreover, such a method may further comprise equalizing the received analog video broadcast signal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an apparatus and method of providing sustainable high video quality in several channel conditions. Referring now to the drawings, and more particularly to FIGS. 1 through 6, where similar reference characters denote corresponding features consistently throughout the figures, there are shown preferred embodiments.

Figure 1:
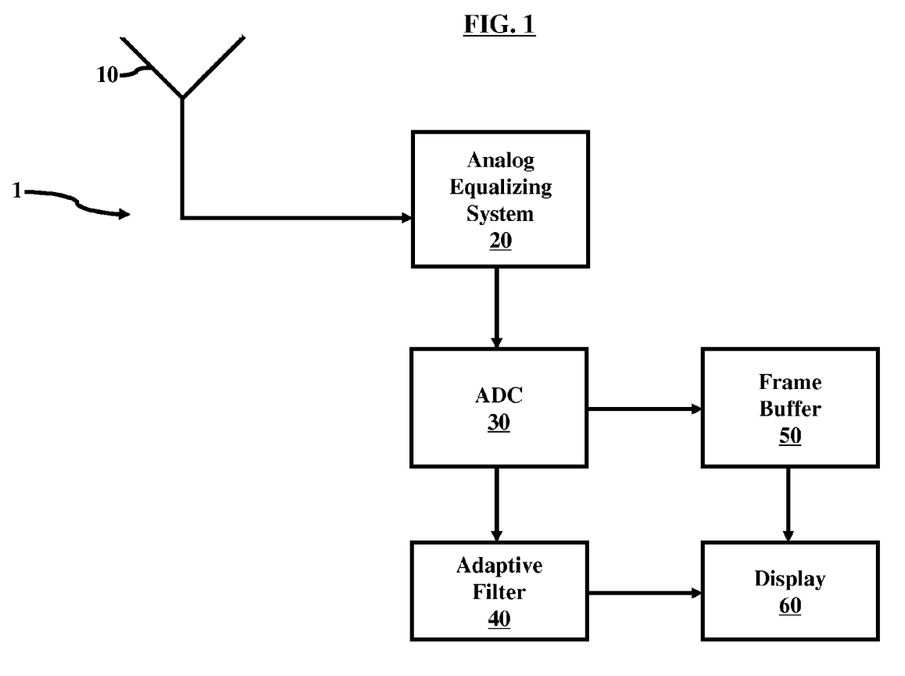
FIG. 1 illustrates a schematic diagram of an adaptive mobile reception apparatus according to an embodiment herein.

FIG. 1 illustrates a schematic diagram of an adaptive filter apparatus according to an embodiment herein. As shown in the embodiment of FIG. 1, adaptive filter apparatus 1 includes receiving antenna 10, analog equalizing system 20, analog-to-digital converter ("ADC") 30, adaptive filter 40, frame buffer 50, and display 60.

As known to those skilled in the art, additional components may be incorporated into adaptive filter apparatus 1 without undue experimentation. Examples of such components include, but are not limited to: digital signal processors, digital-to-analog converters, random access memories, read-only memories, etc. In addition, adaptive filter apparatus 1 describes one category of device of many possible categories of devices. For example, although adaptive filter apparatus 1 includes video adaptive filter 40, adaptive filter apparatus 1 with adaptive filter 40 represents one device category, other device categories include, but are not limited to devices that replace adaptive filter 40 with a digital signal processor, a general purpose processor, a Field Programmable Gate Array device ("FPGA") or a reconfigurable computing device. Thus, for example, a digital signal processor (not shown in FIG. 1) may read adaptive filter instructions from a memory (not shown in FIG. 1), and execute those adaptive filter instructions. Other components shown in FIG. 1 may be similarly substituted with other components to describe additional categories of devices. In addition, embodiments described herein may be limited to one device category or may include all device categories.

Adaptive filter apparatus 1 may receive analog video signal data via receiving antenna 10. For example, receiving antenna 10 may receive, at a 13.5 MHz carrier frequency, video signal data that includes, for example, Y/C component signal data with 720 pixels per horizontal line and 288 lines or 242 lines per vertical field for PAL or NTSC respectively. Receiving antenna 10 may then be coupled to analog equalizing system 20, where analog equalizing system 20 equalizes the received analog video signal data. In the embodiment shown in FIG. 1, analog equalizing system 20 is coupled to an analog-to-digital converter (ADC) 30, where ADC 30 converts the received analog video signal data to digital video signal data. ADC 30 is coupled to adaptive filter 40, which may execute instructions, described below, that instruct adaptive filter 40 to improve video signal quality—e.g., by filtering excessive noise from the digital video signal data and improving the signal-to-noise ratio (SNR) of the video signal data received receiving antenna 10. In addition, while not shown in FIG. 1, adaptive filter 40 may be coupled a display device to display the filtered digital video signal data. Furthermore, while not shown in FIG. 1, analog equalizing system 20 may include an Automatic Gain Controller (AGC) and an analog signal equalizer positioned after the ADC 30.

Analog video broadcast systems typically provide a short span of time between frames. For example, the time between two consecutive frames PAL/NTSC systems is 0.04/0.033 seconds, respectively. Furthermore, if there are no fast motions, the contents of a few consecutive frames are almost similar. In addition, when the consecutive frames are interlaced to form a complete display frame, the two consecutive fields (even field and odd field) are likely part of the same scene. To simplify the discussion of one embodiment below, the individual fields transmitted during interlace mode, whether referring to an even or an odd field, are simply referred to as a separate frame, unless otherwise indicated.

Figure 2:
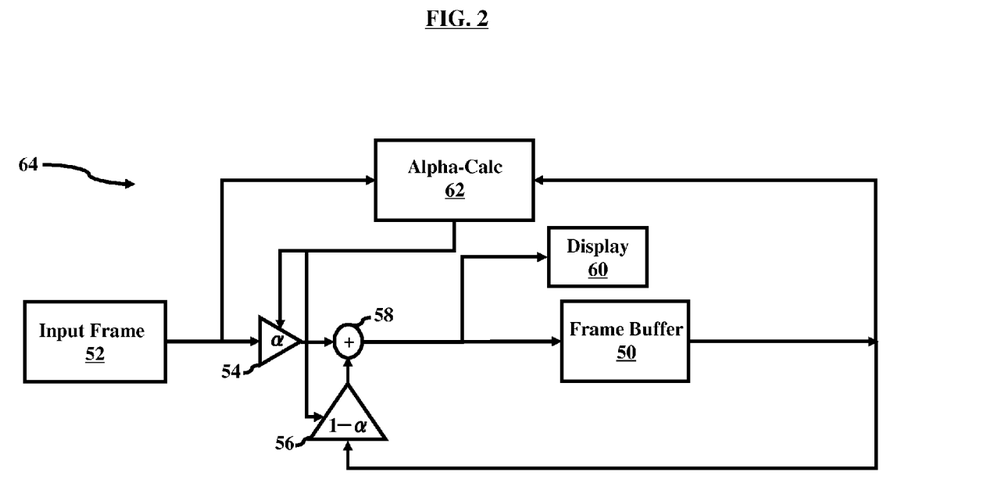
FIG. 2 illustrates a block diagram of a leaky integrator according to an embodiment herein.

All of these properties allow the novel application of leaky integration on consecutive frames. FIG. 2, with reference to FIG. 1, illustrates a block diagram of leaky integrator 64 according to an embodiment herein. As described in further detail below, the embodiment of FIG. 2 applies leaky integration to consecutive frames as follows: Displayed_frame=Frame_buffer=alpha*current_frame+(1−alpha)*Frame_buffer, where alpha is the leaky integration forgetting factor. Since each new (output) frame (e.g., frame buffer 50) is a combination from the current (e.g., input frame 52) and previous frames (not shown), a full frame buffer (e.g., frame buffer 50) will be used in the discussion below.

In FIG. 2, the content of frame buffer 50 is multiplied by FB multiplier 56 (e.g., 1−α) while the current input frame (e.g., input frame 52) is multiplied by IF multiplier 54 (e.g., α). The output of the two multipliers (e.g., IF multiplier 54 and FB multiplier 56) are combined (e.g., adding unit 58) to form a new frame (not shown), which is used to replace the content of frame buffer 50. In addition, the new frame (not shown) produced by adding unit 58 is sent to display 60. As discussed in further detail below, alpha-calc 62 calculates the α value for each pixel using the content of frame buffer 50 and the input frame 52.

Figure 3:
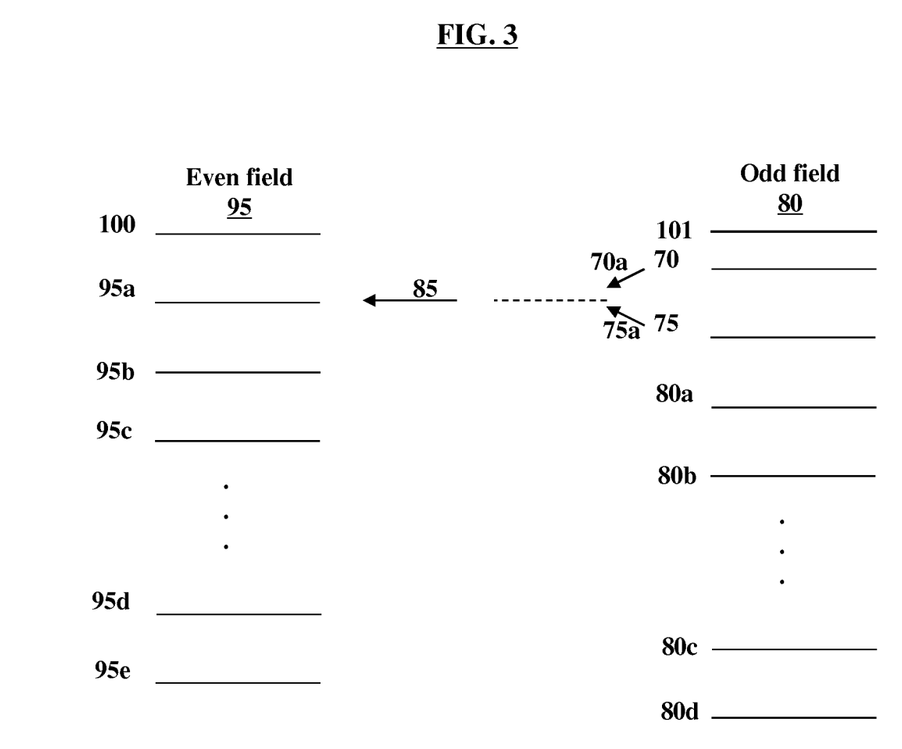
FIG. 3 illustrates a schematic diagram of a line combination according to an embodiment herein.

In interlaced mode, the odd and even fields are shifted with respect to each other by one line. As a consequence, a direct application of the forgetting factor (alpha) above would result in picture jittering at the displayed output video. To remove picture jittering, the embodiments described below reposition the odd fields to be aligned with even fields. One embodiment of repositioning the odd fields is shown in FIG. 3. In FIG. 3, with reference to FIGS. 1 and 2, the repositioning is obtained by calculating (e.g., using adaptive filter 40) an average of two successive lines (e.g., lines 70 and 75) in odd frame 80 to obtain the intermediate line 85. As shown in FIG. 3, line 85 corresponds to line 95a in the even frame 95. In the embodiment shown in FIG. 3, the boundary line 100 is obtained by repeating line 101 in the input odd frame. The embodiment shown in FIG. 3 repositions every line in an odd frame using a calculated average between two lines with a distance of 2 separating the lines. However, the embodiment shown in FIG. 3 is not limited to a distance of two and can take the average to any number of lines separated by any distance.

In the embodiment shown in FIG. 3, repositioning odd frames (e.g., odd field 80) uses averaging between two lines with distance 2 (the upper and lower lines). This operation may cause some loss in vertical resolution of the repositioned frames. In order to mitigate this loss in alternative embodiments, corresponding even lines in the frame buffer (e.g., frame buffer 50) may be calculated (e.g., using adaptive filter 40) as follow: let c is the weight of each odd line, then, the weight of the corresponding even line should be 1−2*c. Consequently, repositioned line 85 is calculated as $R_L = L_1 c + L_3 c + (1-2c)L_2$, where $R_L$ is the repositioned odd line (e.g., repositioned line 85), $L_1$ is the upper odd line (e.g., line 70), $L_3$ is the lower odd line (e.g., line 75), and $L_2$ is the even line that corresponds to $R_L$ (e.g., line 95a).

A general description of the embodiment shown in FIG. 3 is realized by using the original repositioned odd frame (output line=upper line/2+lower line/2) and just updating alpha(s) by 2*c (alpha'(odd)=alpha(odd)*2*c) where c ranges from 0 to 0.5. In the previous equation, the term "2*c" functions as the contribution factor since it determines how much the contribution of the current odd frame in forming the repositioned frame. For example, if contribution factor is 1 then the repositioned frame is completely obtained from the input odd frame (i.e., no contribution from even frame in the buffer). Alternatively, if contribution factor is 0.5 then the repositioned frame is equally formed from even and odd frames and so on.

In other words, the embodiment shown in FIG. 3 may result in a loss of vertical resolution of the repositioned frames in some environments (e.g., where the even and odd frames are substantially different or in the presence of fading, as described below). In order to mitigate this loss, an alternative approach factors into the equation the corresponding even lines in the frame buffer. For example, where c is the contribution factor (e.g., the weight) of each odd line, then the weight of the corresponding even line is 1−2*c.

Since a channel may vary across frames and even lines, further embodiments described herein adapt the filter (leaky integrator) coefficients (e.g., the forgetting factor or alpha) to each pixel in the frame. Such embodiments calculate (e.g., using adaptive filter 40) alpha using an estimation of the current channel power and an estimation of noise within that channel. In one such embodiment, the power of estimated channel per pixel—e.g., $h_n$, corresponding to pixel with index n—is obtained from an equalizer (e.g., analog equalizing system 20) and that estimation of power is used to scale forgetting factor proportionally. Accordingly, if a deep fade (e.g., $h_n \to 0$) is present, the corresponding forgetting factor (e.g., alpha) will have very low or even zero value and so the output is almost obtained from the frame buffer. In other words, as the channel power decreases, the corresponding operating SNR also decreases, but since the forgetting factor (e.g., alpha) is small, more averaging will be applied on the signal that will result in enhancing the SNR.

Another source for low operating SNR within a channel of interest is an increase of noise power itself. Noise may increase, for example, when the receiver (e.g., receiving antenna 10) is at large distance from the transmitting transmitter (not shown). In this case, the received weak signal is rescaled to the full range by an AGC (e.g., analog equalizing system 20) at the receiver side (e.g., adaptive filter apparatus 1), but conventional rescaling with an AGC also increases noise power as well as signal strength. To include this factor in calculated the required averaging (e.g., the alpha value described above), a Norm Ratio (NR) may be used, where NR is the ratio between measured (current) SNR (1/Noise power) and the target SNR. Now the resulted alpha per each input pixel is: alfa=$h_n^2 \cdot$NR.

As shown in FIG. 2, leaky integrator 64 averages (sum) the content of frame buffer 50 after being scaled by FB multiplier 56 (e.g., 1−α) and the current input frame (e.g., input frame 52) after being scaled by IF multiplier 54 (e.g., α). As a consequence, the lower the α value (as calculated by alpha-calc 62), the greater the contribution of frame buffer 50 to the construction (e.g., using adding unit 58) of the new output frame (not shown), which replaces the content of the frame buffer. Since the contents of frame buffer 50 is itself the result of a previous averaging (sum) operation, a greater dependence on frame buffer 50 (e.g., a low α value) means more inclusion of previous frames in constructing the new frame. In other words, the low α corresponds to more averaging between many previous frames in order to construct the new output frame. In one embodiment herein, the value of alpha, as determined by alpha-calc 62, will be automatically adjusted to apply the amount of averaging that achieves the target SNR. By setting target SNR at levels with acceptable picture quality (almost noiseless), the adaptive solution according to embodiments herein will make sure to maintain this level of picture quality. When setting a target SNR, choosing too high target SNR may result in excessive averaging that in turn will distort motion information (motion quality) in the displayed video. This degradation of motion quality may appear as slow-than-normal motion of objects and scenes interference where two or more different scenes combine together at the output frames.

In conventional systems, picture quality and motion quality are inversely proportional and conventional system trade-off between the two measured qualities (e.g., picture quality and motion quality). To overcome these limitations of conventional systems, one embodiment herein modifies alpha, as calculated by alpha-calc 62, according to the following: Regionalizing the Norm Ratio (e.g., set a target SNR for each operating range of SNRs); Motion Detection/Alpha Compensation (e.g., detect motion and increase alpha according to the measured amount of motion (differences between the current and previous frames)); Scene Change Indicator (e.g., detect if new scene is present and stop averaging completely). Each of these improvements over conventional systems is discussed in further detail below.

Thus, for each range of noise powers, one embodiment described herein calculates (e.g., using adaptive filter 40) an optimal normalization factor (e.g., NF) that provides an optimal compromise between the inversely proportional motion quality and picture quality. For example, if a target SNR is set to 30 dB (e.g., by adaptive filter 40) then for all operating SNR ranges greater than or equal to 30 dB, there is no averaging (e.g., by adaptive filter 40). However, if the operating SNR is 25 dB, then amount of averaging (e.g., as calculated by adaptive filter 40) required maintaining 30 dB is 5 dB. For operating SNR 15 dB, the amount of averaging (e.g., as calculated by adaptive filter 40) is 15 dB. As shown, the decrease in the operating SNR will increase averaging (e.g., as calculated by adaptive filter 40) and so degrade motion quality for low SNR operating points.

In other embodiments described herein, rather than of using fixed target SNR a compromise is made regarding a picture quality SNR to avoid observable degradation in displayed motion quality. In further embodiments, to reduce motion jittering caused by variable averaging (e.g., for each different pair of operating and target SNRs, there is different averaging), an averaging gain is calculated (e.g., by adaptive filter 40) for each region instead of fixed target SNR. In the embodiment described below, the fixed averaging gain is also the Norm Ratio [NR]. For example, NR is set as NR=0 dB for the operating SNR range>30 dB while assigning NR=5 dB for the operating SNR range 25 dB to 30 dB and so on. In other words, the averaging gain described above refers to the SNR increase of the output frame after applying the leaky integration (as shown in FIG. 2). According to one embodiment herein, the averaging gain is the NR (where the alpha value is measured in dB, assuming channel power=1). In addition, for smoother transitions between regions, number and boundaries of NR ranges are made programmable.

Further embodiments described herein include a motion detection calculation (e.g., using adaptive filter 40) and compensate alpha based on that calculation (as described below). In such embodiments, a motion measure is calculated for each input pixel in the input frame 52. Preferably each input pixel is sent to leaky integrator 64 in real-time. As discussed below, the measure of motion (e.g. $d_n$) is the difference between the input pixel and the corresponding one in the previous frame (e.g., stored in frame buffer 50): $d_n = |P_n - P_{n-1}|$ where $P_n$ is the input pixel and $P_{n-1}$ is the corresponding pixel in frame. The range of $d_n$ is dependent on the range of $P_n$ which could be determined for each video component (Luma and Chroma). Ideally, any value of $d_n$ greater than zero indicates motion event. The aim of such a calculation (e.g., as performed by adaptive filter 40) is to stop averaging for each input pixel if the corresponding motion measure indicates motion detection. But using this Alpha-Forcing algorithm (set alpha=1 for any $d_n > 0$) is highly biased toward motion (any motion whatever how much it will be observed will pass to the output and frame buffer without averaging). Instead, alternative embodiments use a soft absolute difference of pixels value $d_n$ (motion measure) as a direct measure of how motion will be observed. For example, the absolute difference of the Luma components between the current and previous pixels range from 0 up to 1 (Luma ranges from 0 to 1). Small values ($d_n \to 0$) indicate slight brightness changes and so are less observable than total motion cases ($d_n \to 1$) and so the amount of averaging (alpha value) could be adjusted proportionally by scaled version of motion amount $k*d_n$ where k is the gain or scaler. The resulted motion-based alpha update is:

$$\alpha = \min\left(h_n^2 NR * \left(1 + \frac{k*d}{\max(h_n^2, h_{min}^2)NR}\right), 1\right)$$

The previous equation has two terms, the first one is the normal alpha adaptation equation based on channel power and Norm Ratio. The second term is motion compensation (quality) term used to decrease averaging by adding the scaled motion measure to the picture quality alpha term (first term). Although the motion compensation term should not be dependent on channel state (should decrease averaging based on motion amount what ever the state of picture or channel quality is), the calculation of alpha above includes a predetermined limit on channel power value (e.g., $h_{min}^2$).

In fading channels, the time varying channel power can drop to very sever low level. In such periods (dead regions), the corresponding equalized picture information is almost destroyed by noise and other implementation-wise impairments like clipping. Also most likely the motion detector will erroneously will detect motion. These dead regions are very annoying and should be prevented from appearing at the output. Applying motion compensation term without channel power lower limit (shown in the denominator of the second term in the previous equation) will blindly pass the dead regions into frame buffer and also to the output display. When calculating alpha (e.g., using adaptive filter) as described in the embodiment above, two cases emerge. In case 1, the estimated channel power greater than channel power lower limit. In this case the forgetting factor (e.g., alpha) will be updated as $\alpha = \min(h^2 NR + k*d, 1)$. In this case, the high amount of motion (second term) will dominate the increase of alpha (decrease averaging) independent on channel (picture) quality (provided by the first term). In case 2, the estimated channel power is smaller than channel power lower limit. The very-low values of channel power will stop motion compensation, because alpha is calculated (e.g., using adaptive filter 40) as $$\alpha = \min\left(h^2 NR + \frac{h^2}{h_{min}^2} k*d, 1\right).$$

Since the effect of low channel power on the displayed picture is dependent also on the operating noise level (or operating SNR=$1/\sigma_{curr}$), the channel power lower limit has different values for each operating SNR range. For example, if the operating SNR is 30 dB then only very low values of channel power will affect significantly the quality of the displayed picture and such an embodiment will set (e.g., via adaptive filter 40) the channel lower limit to very low value. On the other hand, for lower SNR (e.g., ~10 dB), the picture quality will start to degrade severely for at moderate drop of the channel power. Then, at this range the channel lower limit need to be high.

In order to support more flexible motion detection, embodiments described below offer different motion gain k for odd and even fields since for interlaced mode, the two consecutive fields (e.g., Even field 95 and Odd field 80, shown in FIG. 3) are most probably out of the same scene and so motion is most likely low.

In the previous discussion, the noise effect on the measured motion (pixels difference) has been ignored, but in practical, noise introduces difficult challenge for motion detection since it could be a major source of the measured pixels difference $d_n$. To reduce the noise effect, an embodiment described herein measures (e.g., via adaptive filter 40) one difference per each block of successive n pixels where the overall distance $d_n$ is the average of each pixel. More noise reduction could be obtained using blocks with more pixels but as the block size increases, some motion information is lost since the internal motions (inside one block) can go without full detection.

The scene change indicator is a special case of motion where completely different scene appears at the input of the frame buffer adaptive filter. If this scene is averaged with the previous frame (could happen under sever channel conditions like dead regions), the resulted displayed picture looks very artificial. For handling such cases, certain embodiments described herein include a scene change indicator that average (e.g., adaptive filter 40) the distances measured for all the blocks in the current frame. If frame distance exceeds a programmable threshold, a scene change flag is set which forces the all the alpha(s) of the next frame to be 1 (i.e. completely replace frame buffer content). Note that the detection of scene change is delayed by one frame since the estimate is made over all the blocks in the input frame. The one frame delay has no noticeable effect since the averaged scene takes very short time at the output (1/25 or 1/30 of sec) before being replaced by the new frame.

Figure 4:
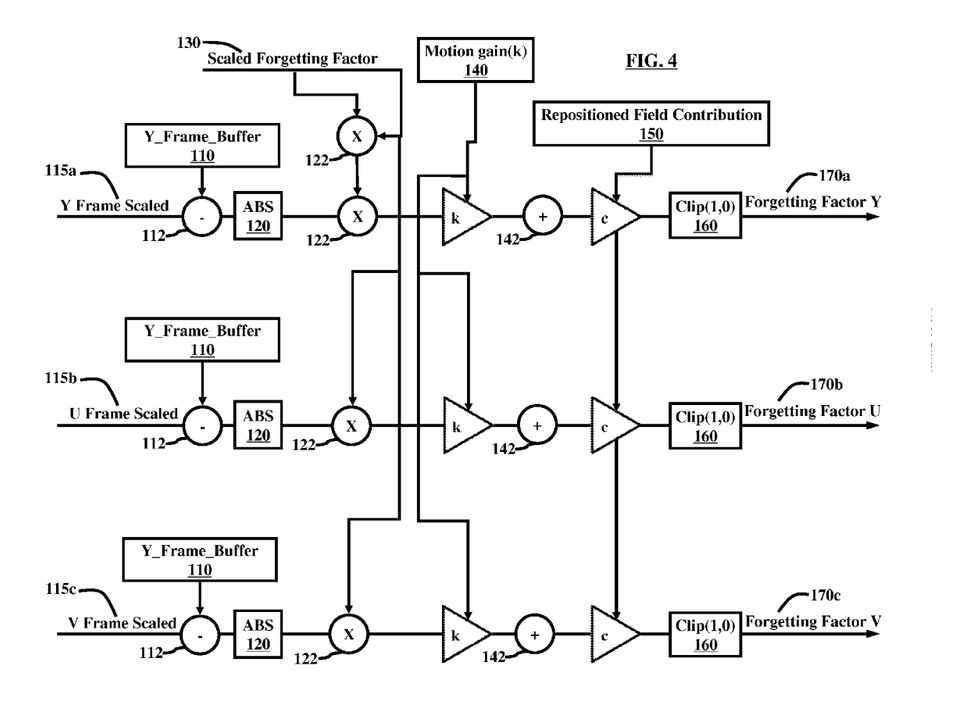
FIG. 4 illustrates a block diagram of an adaptive filter apparatus according to an embodiment herein.

FIG. 4, with reference to FIGS. 1 through 3, illustrates a block diagram of adaptive filter 40 according to an embodiment herein. In the embodiment of FIG. 4, frame scaled (e.g., 115a through 115c) corresponds to each component in a component video signal and is a modified (e.g., scaled down) version of the received frame in order to fit the target display resolution. ABS 120 is an absolute function. In addition, forgetting factor 130 is a control variable used in setting the two adaptive filter coefficients (e.g., adaptive filter 40) as $\alpha$ and $1-\alpha$. Also shown in FIG. 4 is subtraction unit 112, multiplication unit 122, addition unit 142, clip unit 160 and forgetting factors 170a-c. As described above, forgetting factor 170a-c sets a forgetting factor for each component in component video signal. Consequently, the greater the value assumed by forgetting factor 170a-c, the less an output frame is dependent on the previous frames. In addition, repositioned field contribution 150 is the percentage of using the previous frame in producing the current repositioned field (as described above in FIG. 3).

Figure 5:
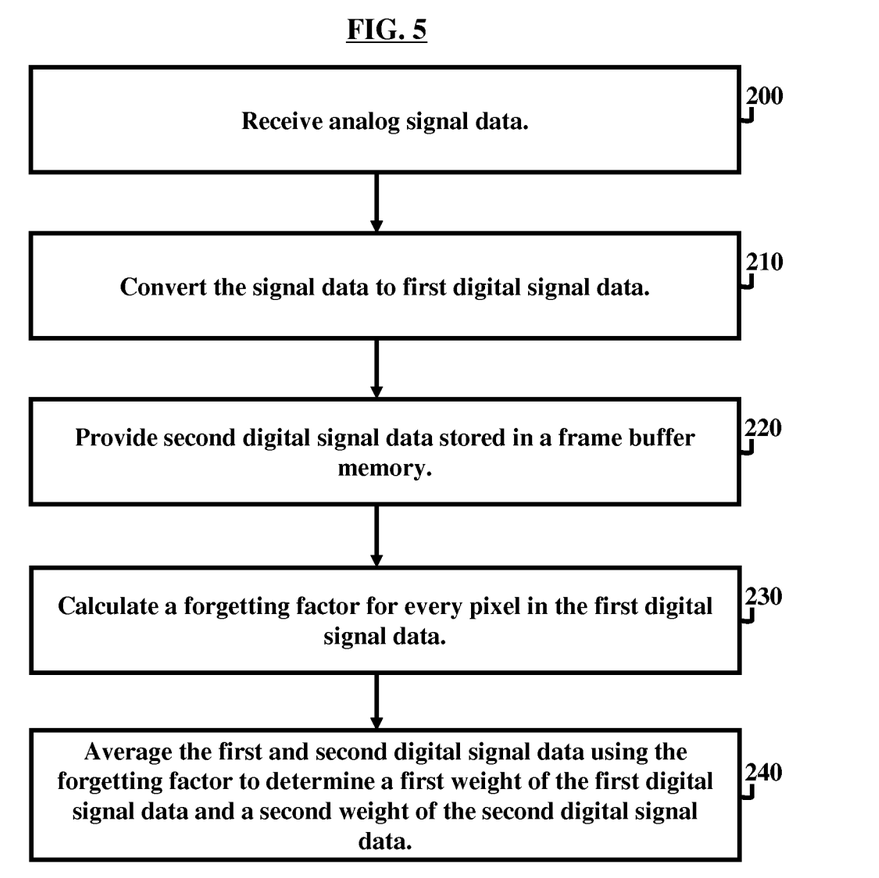
FIG. 5 is a flow diagram illustrating a preferred method according to an embodiment herein.

FIG. 5, with reference to FIGS. 1 through 4, illustrates a flow diagram according to an embodiment herein. In the method of FIG. 5, step 200 describes receiving an analog signal (e.g., using receiving antenna 10, shown in FIG. 1). Step 210 describes converting the signal data to first digital signal data (e.g., using ADC 30). Step 220 describes providing second digital signal data stored in a frame buffer memory (e.g., frame buffer 50). Step 230 describes calculating a forgetting factor for every pixel in the first digital signal data (e.g., using adaptive filter 40). Next, the method of FIG. 4 describes averaging the first and second digital signal data, using the forgetting factor (e.g., as calculated in step 230) to determine a first weight of the first digital signal data and a second weight of the second digital signal data (e.g., using adaptive filter 40). The embodiments herein may be implemented in an analog television application.

In such a method, the first weight may be calculated as $\alpha$ and the second weight may be calculated as $1-\alpha$, where $\alpha$ comprises the forgetting factor. In addition, the analog video broadcast signal data may comprise at least one of an odd analog video signal data and an even analog video signal data.

Such a method may further comprise converting the odd analog video signal to the first digital signal data, wherein the second digital signal data comprises a digitized copy of the even analog video signal data. In addition, the first digital signal data may comprise a plurality of horizontal lines; and each of the plurality of horizontal lines may comprise a plurality of pixel values, and the method may further comprise averaging a first horizontal line of the plurality of horizontal lines and a second horizontal line of the horizontal lines to obtain an intermediate line.

In addition, such a method may further comprise detecting motion between the first digital signal data and the second digital signal data and automatically adjusting the forgetting factor when motion is detected. Such a method may also further comprise detecting a scene change between the first digital signal data and the second digital signal data and automatically setting the forgetting factor to one when the scene change is detected. Furthermore, such a method may further comprise adjusting the forgetting factor using a estimation of channel power and an estimation of noise power. Moreover, such a method may further comprise equalizing the received analog video broadcast signal.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
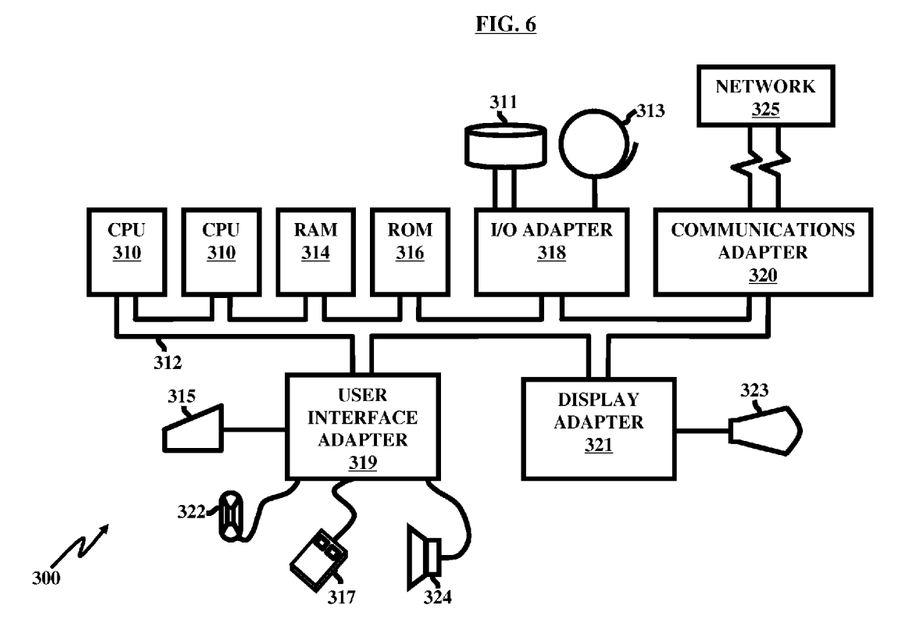
FIG. 6 is a computer architecture used in accordance with the embodiments herein.

A more general representation of the hardware environment for practicing the embodiments herein is depicted in FIG. 6. This schematic drawing illustrates hardware configuration 300 of an information handling/computer system in accordance with the embodiments herein. Hardware configuration 300 comprises at least one processor or central processing unit (CPU) 310. The CPUs 310 are interconnected via system bus 312 to various devices such as a random access memory (RAM) 314, read-only memory (ROM) 316, and an input/output (I/O) adapter 318. The I/O adapter 318 can connect to peripheral devices, such as disk units 311 and tape drives 313, or other program storage devices that are readable by the system. The system can read the inventive instructions on the program storage devices and follow these instructions to execute the methodology of the embodiments herein. The system further includes a user interface adapter 319 that connects a keyboard 315, mouse 317, speaker 324, microphone 322, and/or other user interface devices such as a touch screen device (not shown) to the bus 312 to gather user input. Additionally, a communication adapter 320 connects the bus 312 to a data processing network 325, and a display adapter 321 connects the bus 312 to a display device 323 that may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for adaptively filtering noise from an analog video broadcast signal, said system comprising:
    an antenna that receives analog video broadcast signal data;
    an analog-to-digital converter operatively connected to said antenna and converting the received analog video broadcast signal data to digital video signal data;
    a frame buffer memory storing only a plurality of horizontal lines of said digital video signal data, wherein said plurality of horizontal lines comprise a plurality of pixel values of an input frame;
    an instruction memory storing adaptive filtering instructions; and
    an adaptive filter coupled to said memory and said analog-to-digital converter, wherein said adaptive filter:
        reads said adaptive filter instructions from said memory;
        executes said adaptive filter instructions;
        calculates a forgetting factor for each pixel in said plurality of pixel values stored in said frame buffer memory based on estimation of channel power and noise power;
        averages an input pixel with a corresponding pixel of said horizontal lines stored in said frame buffer memory based on the forgetting factor;
        filters noise from each pixel of said plurality of pixel values stored in said frame buffer memory based on said forgetting factor; and
        calculates a motion detection measure for each said input pixel in said input frame, wherein said motion detection measure equals an absolute value of a difference between said input pixel and a corresponding input pixel in a previous input frame positioned immediately before said input frame stored in said frame buffer memory, and wherein the averaging of said input pixel is proportionally adjusted by a scaled version of motion amount for each said input pixel when said motion detection measure is greater than zero.

2. The system of claim 1, further comprising an analog signal equalizing system coupled to said analog-to-digital converter, wherein said analog signal equalizing system equalizes said received analog video broadcast signal data.

3. The system of claim 2, wherein said analog equalizing system comprises at least one of an automatic gain controller and an equalizer.

4. The system of claim 3, wherein said analog equalizing system comprises an automatic gain controller and said adaptive filter compensates said forgetting factor for said noise measured by said equalizer.

5. The system of claim 3, wherein said analog equalizing system comprises an equalizer and said adaptive filter compensates said forgetting factor for said channel power measured by said equalizer.

6. The system of claim 1, wherein said analog video broadcast signal data comprises at least one of an odd analog video signal data and an even analog video signal data.

7. The system of claim 6, wherein said analog-to-digital converter converts said odd analog video signal to odd digital video signal data and said analog-to-digital converter converts said even analog video signal data to digital video signal data.

8. The system of claim 7, wherein said frame buffer memory comprises a display frame.

9. The system of claim 8, further comprising a display device, wherein said adaptive filter averages said input pixel to a corresponding pixel in said frame buffer and send the average to said display device and to the corresponding pixel location in said frame buffer memory.

10. The system of claim 9, wherein a horizontal input line is repositioned when said horizontal input line corresponds to an odd frame, wherein said repositioning averages an upper and a lower input line using a corresponding horizontal line stored in said frame buffer memory.

11. The system of claim 1, wherein said adaptive filter adjusts said forgetting factor using said estimation of channel power and said estimation of noise power.

12. A method of adaptively filtering noise in analog video broadcast signal data, said method comprising:
receiving said analog signal data;
converting said analog video broadcast signal data to first digital signal data comprising a plurality of first pixel values;
providing second digital signal data stored in a frame buffer memory, wherein said second digital signal data comprises a plurality of second pixel values;
calculating a forgetting factor for every pixel in said first digital signal data;
averaging said first digital signal data and said second digital signal data using said forgetting factor to determine a first weight to adjust said first digital signal data and a second weight to adjust said second digital signal data; and
detecting motion between said first digital signal data and said second digital signal data and automatically adjusting said forgetting factor when motion is detected, wherein the detecting of motion comprises calculating a motion detection measure for each input pixel in an input frame, wherein said motion detection measure equals an absolute value of a difference between said input pixel and a corresponding input pixel in a previous input frame positioned immediately before said input frame stored in said frame buffer memory, and wherein the averaging of said input pixel is proportionally adjusted by a scaled version of motion amount for each said input pixel when said motion detection measure is greater than zero.

13. The method of claim 12, wherein said first weight is calculated as $\alpha$ and said second weight is calculated as $1-\alpha$, where $\alpha$ comprises said forgetting factor, and wherein a displayed frame is computed based on multiplication of $\alpha$ and first signal data and further based on multiplication of $1-\alpha$ and said second digital signal data.

14. The method of claim 12, wherein said analog video broadcast signal data comprises at least one of an odd analog video signal data and an even analog video signal data.

15. The method of claim 14, further comprising converting said odd analog video signal to said first digital signal data, wherein said second digital signal data comprises a digitized copy of said even analog video signal data.

16. The method of claim 15, wherein said first digital signal data comprises a plurality of horizontal lines; and each of said plurality of horizontal lines comprises a plurality of pixel values, and said method further comprises averaging a first horizontal line of said plurality of horizontal lines and a second horizontal line of said horizontal lines to obtain an intermediate line.

17. The method of claim 12, further comprising detecting a scene change between said first digital signal data and said second digital signal data and automatically setting said forgetting factor to one when said scene change is detected.

18. The method of claim 12, further comprising adjusting said forgetting factor using a estimation of channel power and an estimation of noise power.

19. The method of claim 12, further comprising equalizing said received analog video broadcast signal.

20. The method of claim 12, wherein said analog video broadcast signal data is configured for a mobile receiver comprising any of a National Television Systems Committee (NTSC) standard, a Phase Alternate Line (PAL), and a Sequential Color with Memory (SECAM) standard.

* * * * *